United States Patent
Pancholi et al.

(10) Patent No.: US 12,443,464 B2
(45) Date of Patent: Oct. 14, 2025

(54) AUTONOMOUS WORKLOAD HOMING IN A MULTI-TENANT ENVIRONMENT

(71) Applicant: Dell Products L.P., Round Rock, TX (US)

(72) Inventors: Ashish A. Pancholi, Cary, NC (US); Bina K. Thakkar, Cary, NC (US); David C. Waser, Holly Springs, NC (US)

(73) Assignee: Dell Products L.P., Round Rock, TX (US)

( * ) Notice: Subject to any disclaimer, the term of this patent is extended or adjusted under 35 U.S.C. 154(b) by 862 days.

(21) Appl. No.: 17/511,682

(22) Filed: Oct. 27, 2021

(65) Prior Publication Data

US 2023/0127840 A1    Apr. 27, 2023

(51) Int. Cl.
  *G06F 9/50* (2006.01)
  *G06N 3/09* (2023.01)
  *G06N 20/00* (2019.01)

(52) U.S. Cl.
  CPC ............ *G06F 9/5088* (2013.01); *G06F 9/505* (2013.01); *G06N 3/09* (2023.01); *G06N 20/00* (2019.01)

(58) Field of Classification Search
  CPC ....... G06F 9/5088; G06F 9/505; G06N 20/00; G06N 3/09; G06N 20/09
  See application file for complete search history.

(56) References Cited

U.S. PATENT DOCUMENTS

| | | | | |
|---|---|---|---|---|
| 10,650,326 | B1* | 5/2020 | Johnston | G06F 16/23 |
| 11,797,705 | B1* | 10/2023 | Voinea | G06F 21/6245 |
| 2018/0210763 | A1* | 7/2018 | Kumar | G06F 9/5077 |
| 2019/0026489 | A1* | 1/2019 | Nerurkar | G16H 10/60 |
| 2019/0340095 | A1* | 11/2019 | Faibish | G06F 11/302 |
| 2021/0141986 | A1* | 5/2021 | Ganille | G06Q 10/04 |
| 2021/0326275 | A1* | 10/2021 | Anirudhan | G06F 11/3034 |

* cited by examiner

*Primary Examiner* — Jacob D Dascomb
(74) *Attorney, Agent, or Firm* — Jackson Walker L.L.P.

(57) ABSTRACT

A methods for identifying a multi-tenant storage array for an application workload includes identifying workload parameters and defining a plurality of groups for each parameter and a plurality of "bins" corresponding to tuples of the groups. Exemplary workload parameters include a percent read parameter and an I/O size parameter. A bin mix of the workload is determined based on historical data wherein the bin mix indicates bins associated with workload activity exceeding a specified threshold. The bin mix is used to define at least some inputs for a supervised learning model of a process for homing application workloads in a multi-tenant storage array. After appropriate training of the model with a generative adversarial network, the model may be invoked to infer or predict attributes of a suitable storage array. The workload may be associated with a scaling factor that influences the determination of a suitable storage array.

20 Claims, 6 Drawing Sheets

| | 202 | 204 | 206 | 201-1 | | 201-2 | | | 201-2 |
|---|---|---|---|---|---|---|---|---|---|
| | Customer | Industry | System | % READ 0 - 10% I/O SIZE 0 -5KB | ... | % READ 20 - 30% I/O SIZE 10-25KB | % READ 30 - 40% I/O SIZE 10-25KB | ... | % READ 90-100% I/O SIZE 10-25KB |
| 210-1 → | C1 | I1 | S1 | 1 | 1 | | 1 | | |
| 210-1 → | C1 | I1 | S2 | 0 | 0 | | | | 1 |
| | ... | | | | | 1 | | 1 | 1 |
| | | | | | | | | | |

| | Input | Type | Example |
|---|---|---|---|
| | | 310 | 311 |
| 301 → | % Read | Workload Mix | 50% |
| 302 → | IO Size | Workload Mix | 8k, 4k, etc. |
| 303 → | Operation | Categorical | Read, write, delete, append |
| 304 → | Data/Metadata | Categorical | Headers, get attr, set attr, etc. |
| 305 → | Protocol | Binary | CIFS, NFS |
| 306 → | Dedup | Binary | Y/N |
| 307 → | Pattern | Binary | Random/Sequential |
| | ... | ... | |

EXEMPLARY TEST CASE INPUTS
(FILE SYSTEM STORAGE)

FIG. 3

| | Input | Type | Example |
|---|---|---|---|
| | | 410 | 411 |
| 401 → | % Read | Workload Mix | 50% |
| 402 → | IO Size | Workload Mix | 8k, 4k, etc. |
| 403 → | # Threads | Numerical | 1-100 |
| 404 → | Dedup | Binary | Y/N |
| 405 → | Pattern | Binary | Random/Sequential |
| 406 → | ... | | |
| 407 → | | | |

EXEMPLARY TEST CASE INPUTS
(BLOCK STORAGE)

FIG. 4

AUTONOMOUS WORKLOAD HOMING IN A MULTI-TENANT ENVIRONMENT

TECHNICAL FIELD

The present disclosure relates to cloud-based storage and, more specifically, locating suitable homes for diverse workloads in a multi-tenant storage environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a cloud computing environment, information handling systems may be implemented as a shared pool of highly available, network accessible information handling resources that can rapidly provisioned for use by a particular user or customer. Storage as a service (StaaS) refers to a cloud computing service model in which public cloud storage resources are employed to store user data for two or more users. StaaS solutions may employ a multi-tenant storage architecture, in which a centralized storage infrastructure is configured to provide service-oriented storage for multiple tenants, i.e., multiple customers.

After a StaaS architecture is implemented and a customer requests resources for a particular workload, the service provider must identify physical and/or virtualized resources that are available and suitable for the workload. Within this disclosure, the term "homing" may be used to refer to the process of identifying specific resources for a particular workload. Two common uses cases in which homing is needed include the homing of new workloads and the migration of existing workloads. For numerous reasons, at least some of which are referenced in the following disclosure, homing of workloads in a multi-tenant StaaS environment is challenging.

SUMMARY

In accordance with teachings disclosed herein, common problems associated with migrating or otherwise homing an application workload in a multi-tenant environment are addressed by disclosed information handling systems and methods for identifying a suitable multi-tenant storage array for the workload. Disclosed information handling systems may include one or more general purpose processors and computer readable storage medium that includes processor-executable instructions, wherein the instructions, when executed by the processor cause the system to perform disclosed methods. Such disclosed methods include identifying workload parameters associated with an application workload and defining a plurality of groups for each of the workload parameters and a plurality of bins wherein each bin corresponds to a tuple of the plurality of groups. For example, if two workload parameters are identified and ten groups are defined for the first parameter while eight groups are defined for the second parameter, this results in a total of 80 bins where each bin is associated with a unique 2-tuple identifying one of the ten first parameter groups and one of the eight second parameter groups.

In at least some embodiments, the selected workload parameters include a percent read parameter and an I/O size parameter. The percent read parameter may be associated with ten groups, each of which corresponds to a range of percent read values (e.g., 0-10%, 10-20%, etc.) Similarly, the I/O size parameter may be associated with a number of categories, each corresponding to a range of I/O size values. The groupings of the two parameters define workload "bins" wherein each bin corresponds to one percent read group and one I/O size group.

After defining the parameters, groups, and bins, a bin mix of the workload is determined based on historical data, where the bin mix indicates workload bins associated with workload activity exceeding a specified threshold corresponding to substantial workload. The identified bin mix may then be used to define at least some inputs for a supervised learning model of a process for homing application workloads in a multi-tenant storage array.

In addition to the bin mix inputs, other inputs may be defined. In some cases, the other inputs may indicate storage specific attributes. For example, if the workload is associated with block storage, one or more inputs corresponding to one or more attributes of block storage may be included in the model. of the Outputs or labels for the model may also be defined where at least some of the labels correspond to attributes of a storage array. After appropriate training of the model, the model may be invoked to infer or predict attributes of a storage array suitable for homing the workload. The predicted attributes may then be used to identify a suitable multi-tenant storage array for the workload. In some embodiments and implementations, the workload may be associated with a scaling factor indicative of an expected growth of the workload and, in such embodiments, the scaling factor may influence the determination of a suitable storage array. For example, if the historical data for a workload indicates N threads for a particular workload bin, the number of threads parameter may be scaled in accordance with the expected growth when identifying a suitable storage array. As examples, the workload may be associated with a no growth or precise fit factor, in which case the number of threads, N, may not be a scale, or the workload is associated with moderate growth and N is scaled by a factor of 2, or the workload is associated with large and/or rapid growth and N is scaled by a factor of 10, 100, or another suitable value.

Training the model may be based, at least in part on, historical data, one or more test cases, or a combination of both. In at least one embodiment, the model includes aspects of a generative adversarial network that includes a test case generator and a discriminator. The test case generator may determine, obtain, or estimate a probability distribution for the model inputs. Inputs may include numerical inputs, categorical inputs, binary inputs, and so forth. The generator may provide each input to a corresponding segment of the generator where each segment that includes an activation function suitable for the type of input and a LSTM cell. As examples, a hyperbolic tangent (tank) function may be used as the activation function for a numeric input while a softmax function may be used for categorical inputs. The discriminator may be implemented as a multi-level perceptron configured to receive test cases from the generator as well as real data. If the discriminator is able to accurately distinguish between the test cases and the real data, the model is incrementally refined.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a table illustrating workload mix for a specified set of input parameters;

FIG. 3 is a table illustrating exemplary inputs for a file system storage embodiment;

FIG. 4 is a table illustrating exemplary inputs for a block storage embodiment;

DETAILED DESCRIPTION

Figure 1:
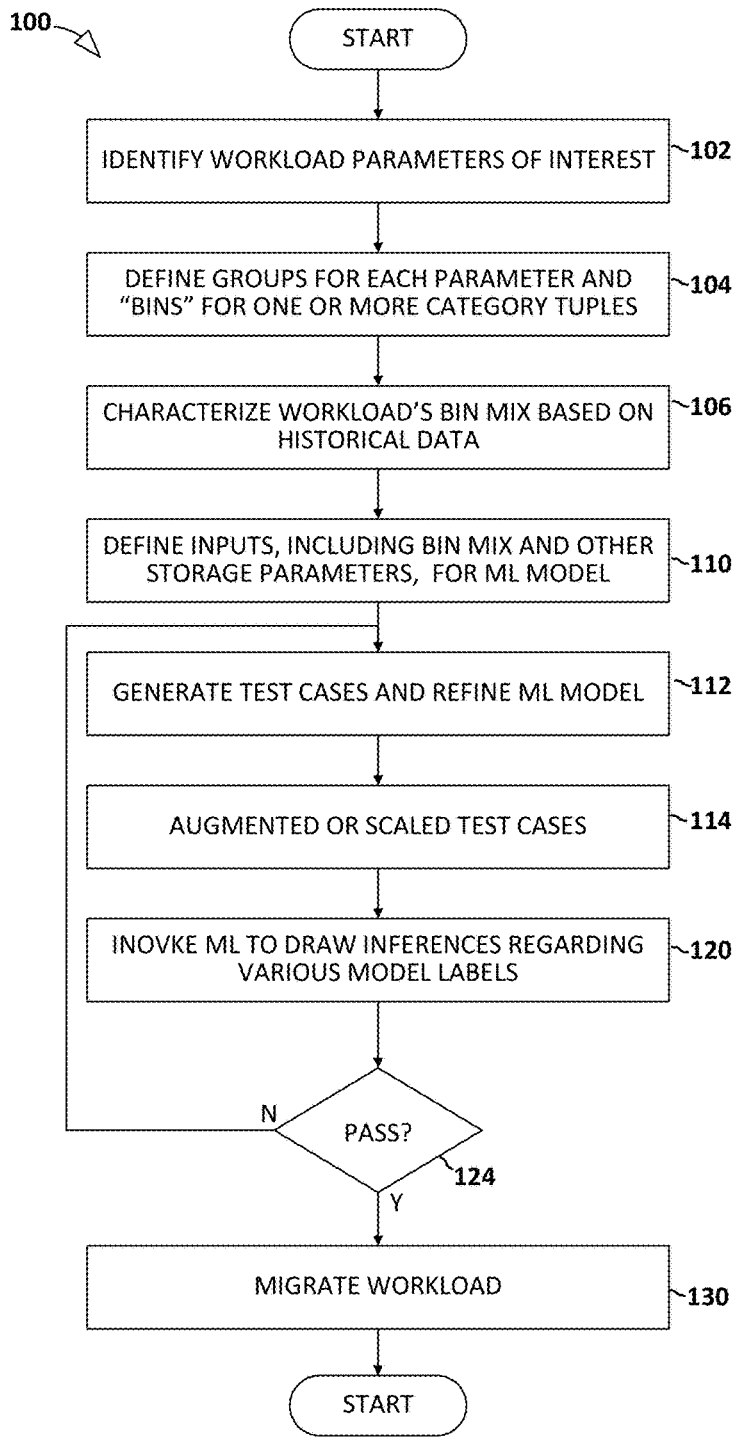
FIG. 1 is a flow diagram of a method for homing a workload application in a multi-tenant environment.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a flow diagram of an exemplary method 100 for homing a workload within a multi-tenant storage environment 100. The illustrated method 100 begins with the identification (block 102) of parameters, referred to herein as workload parameters of interest or, more simply, workload parameters. The identified workload parameters may preferably include one or more readily available or easily derived parameters or metrics that may be useful in identifying multi-tenant arrays suitable for homing the applicable workload. For purposes of illustrating and describing the disclosed method, workload parameters referenced frequently in the following description include a read percentage parameter and an I/O size parameter. As suggested by their names, the read percentage parameter indicates the percentage of I/O operations in which the host reads data from a storage array while the I/O size parameter is a metric pertaining to the amount of data associated with one or more I/O requests.

Those of ordinary skill in the fields of cloud-based storage solutions and machine learning models will recognize that it is not feasible, necessary, or even desirable to identify all possible parameters, metrics, and/or variables that might be included in an ML model for the workload homing function. While certain performance metrics such as I/O operations per second (IOPS) and latency are frequently cited by customers as targeted parameters, those performance metrics may not be directly detectable or readily derived from historical workload data. In contrast, a parameter such as I/O size, which may serve as a cost basis for an on-demand service, may be more easily and reliable obtained. When combined with a percent read parameter, for which a variety of measurement tools are readily available, the combination of parameters may be particularly suitable for including an ML model. Moreover, those of ordinary skill will appreciate that although the description herein refers to two specific but generic workload parameters of interest, numerous other parameters may be of value in the context of a specific configuration. To illustrate by way of example, in addition to I/O size and percent read, other parameters of interest may include as non-limiting examples, whether a work load is network attached storage (NAS)-based or block-based. Homing a NAS-based workload may be more efficient if attributes and other features native to NAS are taken into consideration. For a block-based workload, multiple logical unit numbers (LUNs) are typically involved. A database workload may maintain database journals and the underlying database on different LUNs. Migrating such a workload may require a consideration of per-LUN metrics.

The illustrated example of method 100 includes an operation (block 104) for defining groups, ranges, categories, or clusters for each parameter of interest. Defining groups or categories for numerical parameters such as I/O size and percent read is a well-known strategy employed in various machine learning applications. Grouping and categorizing beneficially transform a variable with a potentially infinite input domain into a parameter with a manageable dimensionality. Grouping performed on two or more parameters of interest beneficially defines a finite and manageable number of workload "bins" that may be exploited by the ML model.

For purposes of illustrating method 100 within this disclosure, the identified parameters of interest, as discussed above, include percent read and I/O size. In addition, the percent read parameter will be categorized into ten groups, each of which has a "width" of 10%. Thus, a first percent read category includes read percent values in the range of 0% to 10%, a second percent read category includes percent read values from 10% to 20% and so forth. Similarly, the I/O size parameter is grouped into one of twelve I/O size groups for purposes of illustrating method 100 with the following upper limits, 5 KB, 10 KB, 25 KB, 50 KB, 100 KB, 200 KB, 300 KB, 500 KB, 1 MB (1000 KB), 2 MB, 5 MB, and 10 MB. Again, it will be readily appreciated that the number of categories an specific boundaries for each of these categories is a design/implementation detail that may well vary among various embodiments. Thus, other embodiments may employ more, fewer, and/or a different number of categories and different upper and/or lower limits for each category.

After defining groups or categories for one or more parameters of interest the method 100 illustrated in FIG. 1 may also define workload bins for at least some of inter parameter pairs/tuples. Continuing with the example of an embodiment in which an I/O size parameter is grouped into twelve categories and a percent read parameter is grouped into ten categories, the illustrated method may identify as many as 120 (10×12) workload bins with each bin representing a particular I/O size and a particular percent read parameter.

In addition to workload mix parameters, embodiments of method 100 may incorporate and consider additional inputs or features that might provide insight into workload behavior and, more specifically, workload suitability for any potential multi-tenant storage array. The exemplary table 200 illustrated at FIG. 2 (below), as an example, includes, in addition to columns for the various workload mix parameters, an additional three columns identifying a customer, an industry, and system. In some embodiments, these "indirect" parameters may reveal dependencies that can be considered in the array identification and migration process.

After defining categories and workload bins for a particular workload, the illustrated method further includes characterizing (block 106) a workload bin mixed based on historical data. An example of characterizing a workloads bin mix is illustrated and described below with respect to FIG. 2 below. Generally, the bin mixed characterization block identifies workload mix tuples that historically experience substantial workload. The method 100 illustrated in FIG. 1 further includes defining (block 110) appropriate inputs for a machine learning (ML) model of the multi-tenant homing objective. The appropriate inputs for the ML model may include, in addition to the bin mix inputs indicative of the bin mix characterization of operation 106 may include other storage parameters and other miscellaneous parameters each of which may represent a discrete variable continuous variable or a category of information. Tables illustrating exemplary inputs for block-based and file system based storage are illustrated in FIG. 3 and FIG. 4.

Figure 5:
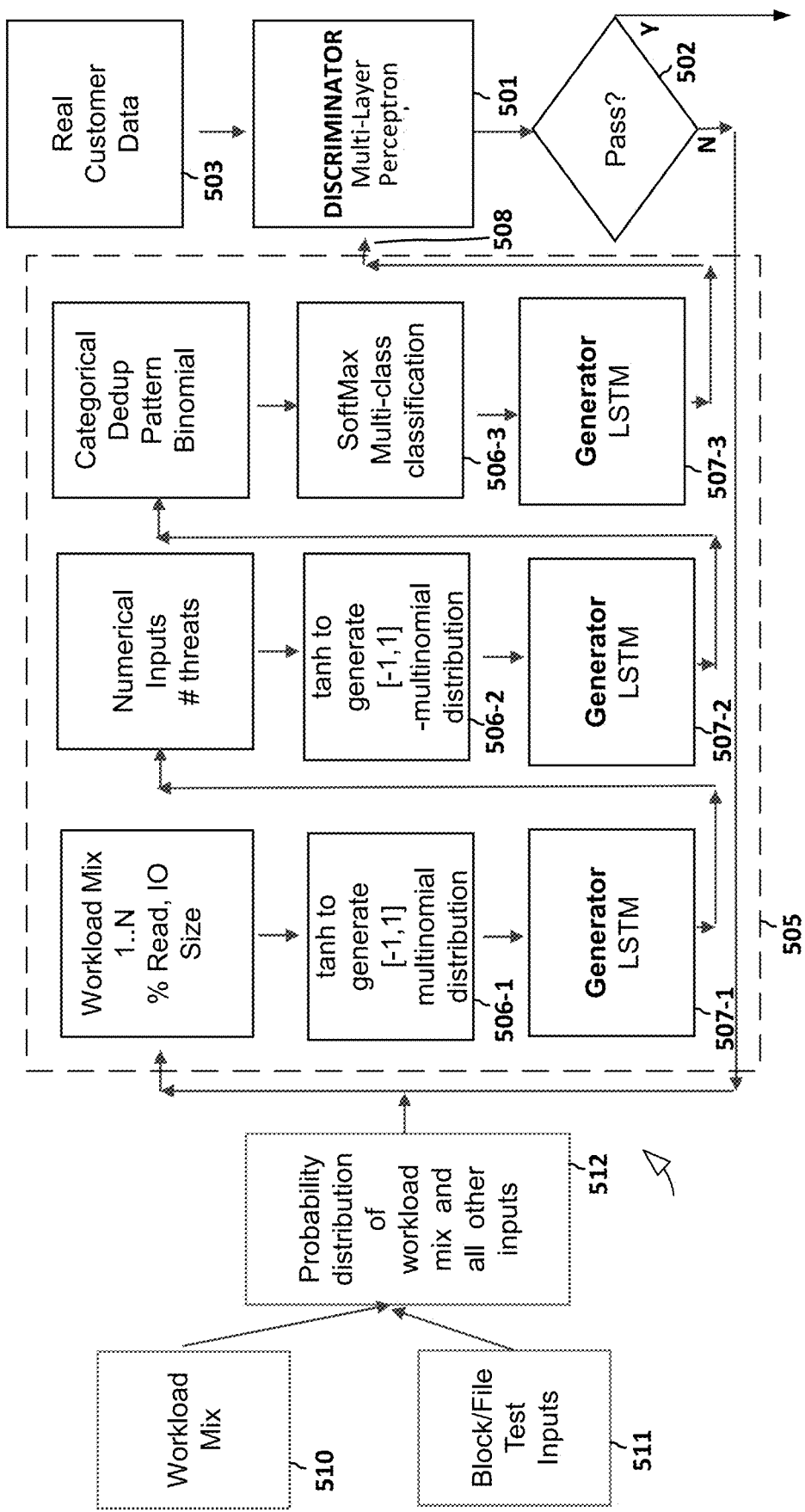
FIG. 5 illustrates an exemplary test case generator.

After defining appropriate inputs for an ML model, the method 100 Illustrated in FIG. 1 may continue by performing operations to train and refine (block 112) a machine learning model for the multi-tenant workload homing function. An exemplary platform suitable for generating test cases and refining the ML model is illustrated in FIG. 5 below.

Method 100 may further include augmenting or scaling (block 114) the ML model to accommodate various growth scenarios for the applicable workload. this operation contemplates taking into consideration the potential growth or scaling anticipated for a workload and identifying and allocating a storage array accordingly. To illustrate with an example, a model may be developed for a homing a particular workload and this model may subsequently be refined to account for moderate significant or little anticipated growth. An example of Augmentin or scaling as illustrated and described below with respect to figure six.

After augmenting and or scaling a machine learning model, the method 100 illustrated in FIG. 1 may Invoke (block 120) the supervisor learning to choose a destination or a using the machine learning model as an inference engine to identify one or more suitable destination array. If it is determined (block 124) that the evaluation is successful, the illustrated method 100 may then migrate (block 130) the workload. If the evaluation fails at block 124, the operation may return to block 112 for generation of additional test cases and further refinement of the model.

Referring now to FIG. 2, a table 200 illustrates an exemplary data structure for conveying characteristics of a particular workload against a defined set of parameters. The table 200 of FIG. 2 conveys a workload mix of the applicable workload based on a combination of two parameters of interest, an I/O size parameter and a percent read parameter discussed above. Consistent with the example used to illustrate method 100 in FIG. 1, the table 200 includes a column or feature 201 corresponding to as many as 120 workload bins where each bin corresponds to a particular percent read and I/O size combination. Thus, for example, column 201-1 corresponds to a percent read category of 0 to 10% and an I/O size category of less 0 to 5 KB, column 201-2 corresponds to percent read category 20 to 30% and an I/O size category of 10 to 25 KB and so forth.

As illustrated in FIG. 2, in addition to the workload parameter categories 201, the table 200 of FIG. 2 includes additional parameters that may be employed and monitored to identify relationships between workload characteristics and other metrics, for example, table 200 includes column 202 corresponding to a particular customer, column 204 includes information indicative of a particular industry, and column 206 includes information pertaining to a specific information handling system. Each record 210 of table 200 specifies the workload mix of a particular combination of customers, industry, and systems. Again, however, it will be appreciated that the particular parameters illustrated in table 200 are intended to be exemplary and that any implementation may include additional, fewer, or different workload parameters of interest.

FIG. 3 and FIG. 4 depict tables 300 and 400 respectively illustrating exemplary test case inputs for different types of workloads. The table 300 illustrated in FIG. 3 includes an input name column 310 and an input type column 311 and indicates an exemplary set of inputs 301-307 for file-based storage while the table 400 illustrated in FIG. 4 includes an input name column 410 and an input type column 411 and indicates an exemplary set of inputs 401 through 405 for block-based storage. Both tables reflect the ability to accommodate different input types. The table 300 illustrated in FIG. 3, as an example, accommodates three distinct types of inputs including workload mix inputs 301 (% read) and 302 (I/O size), categorical inputs 303 (operation type), 304 (metadata), and binary inputs 305 (file system protocol), 306 (deduplication), and 307 (access pattern). Table 400 of FIG. 4, applicable to block based storage, includes workload mix parameters 401 (% Read) and 402 (I/O size), a numerical input 403 (No. of threads) and two binary inputs 404 (deduplication) and 405 (access pattern). Although FIG. 3 and FIG. 4 illustrate exemplary inputs for two types of storage, the number of inputs and the specific set of inputs illustrated is non-limiting. Other embodiments may include more, fewer, and/or different inputs. Similarly, the specific types of inputs illustrated in FIG. 3 and FIG. 4 is exemplary.

Referring now to FIG. 5, an exemplary machine learning framework 500, suitable for use in conjunction with the method 100 illustrated in FIG. 1, is depicted. The framework 500 illustrated in FIG. 5 may be characterized as a generative adversarial network (GAN) in which a discriminator 501 receives real test data 503 as a first input and test case data 508, produced by a generator 505, as a second input. Discriminator 501 attempts to distinguish between test case data 508 and the real customer data 503. Until discriminator 501 is unable to accurately distinguish between the two inputs, the test decision in block 502 fails and generator 505 is iteratively and incrementally refined. When discriminator 501 is ultimately unable to distinguish test cases data 508 from real customer data 503, i.e., when test block 502 passes, the trained model of the multi-tenant homing function is approved for use in conjunction with drawing inferences from new sets of data as illustrated and described in FIG. 7.

The illustrated generator 505 receives various type of inputs including work load mix inputs 510 and storage-specific test inputs 511 (e.g., for block storage embodiments or file system storage embodiments). The framework 500 illustrated in FIG. 5 determines or estimates a probability distribution 512 for the entire group of inputs combined. Generator 505 draws inputs from the probability distribution 512 and includes segments 504 for each type of input. Each segment 504 includes an activation function 506 to produce a desirable distribution of the inputs and a long short term memory (LSTM) block 507. A tank function is used as the activation functions 511 for the bin mix inputs in segment 504-1 and the numerical inputs in segment 504-2, while a softmax activation function 511-3 is used for the categorical inputs in segment 504-3.

Figure 6:
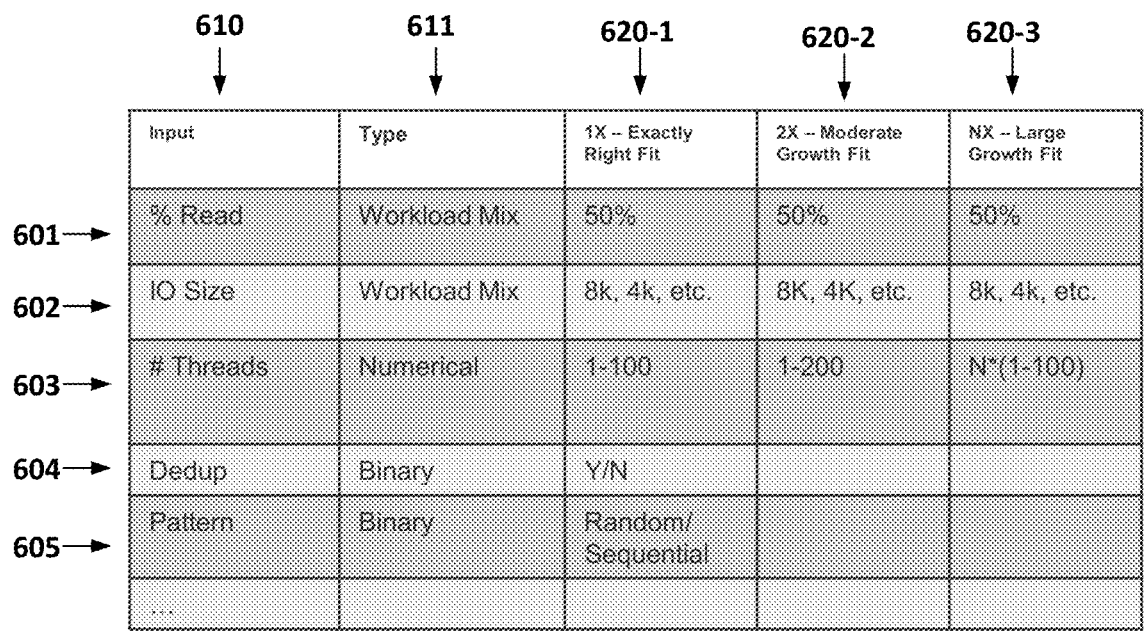
FIG. 6 illustrates a table accommodating scaling of a workload based on an expected growth parameter.

FIG. 6 illustrates a table 600 suitable for accommodating scaling functionality in the determination of a suitable multi-tenant home for a workload. The illustrated table 600 includes columns 610 and 611 indicating an input and a type analogous to the columns 310 and 311 in FIG. 3 and columns 410 and 411 in FIG. 4.

In addition, however, the table 600 illustrated in FIG. 6 includes a set of three columns 620-1 through 620-3 corresponding to three different categories of an expected growth parameter. Column 620-1 represents the baseline or "unscaled" column corresponding to a low or no growth expectation, or to a "precise fit" application. As such, column 620-1 indicates unscaled values for each of the parameters 601 through 605. Column 620-2 corresponds to a moderate growth expectation and includes one or more values that have been scaled relative to the corresponding value(s) in column 620-1. In the illustrated example, the # threads parameter (603) has an unscaled value of 1-100 and a moderate growth value of 1-200. Similarly, column 620-3, corresponding to a large growth expectation, includes a value for the # threads parameter 603 that is scaled by a factor of "N" where N is presumably greater than 2. In at least some embodiments, the scaling factor columns may be invoked to identify multi-tenant storage arrays suitable for accommodating the scaled version of the workload.

Figure 7:
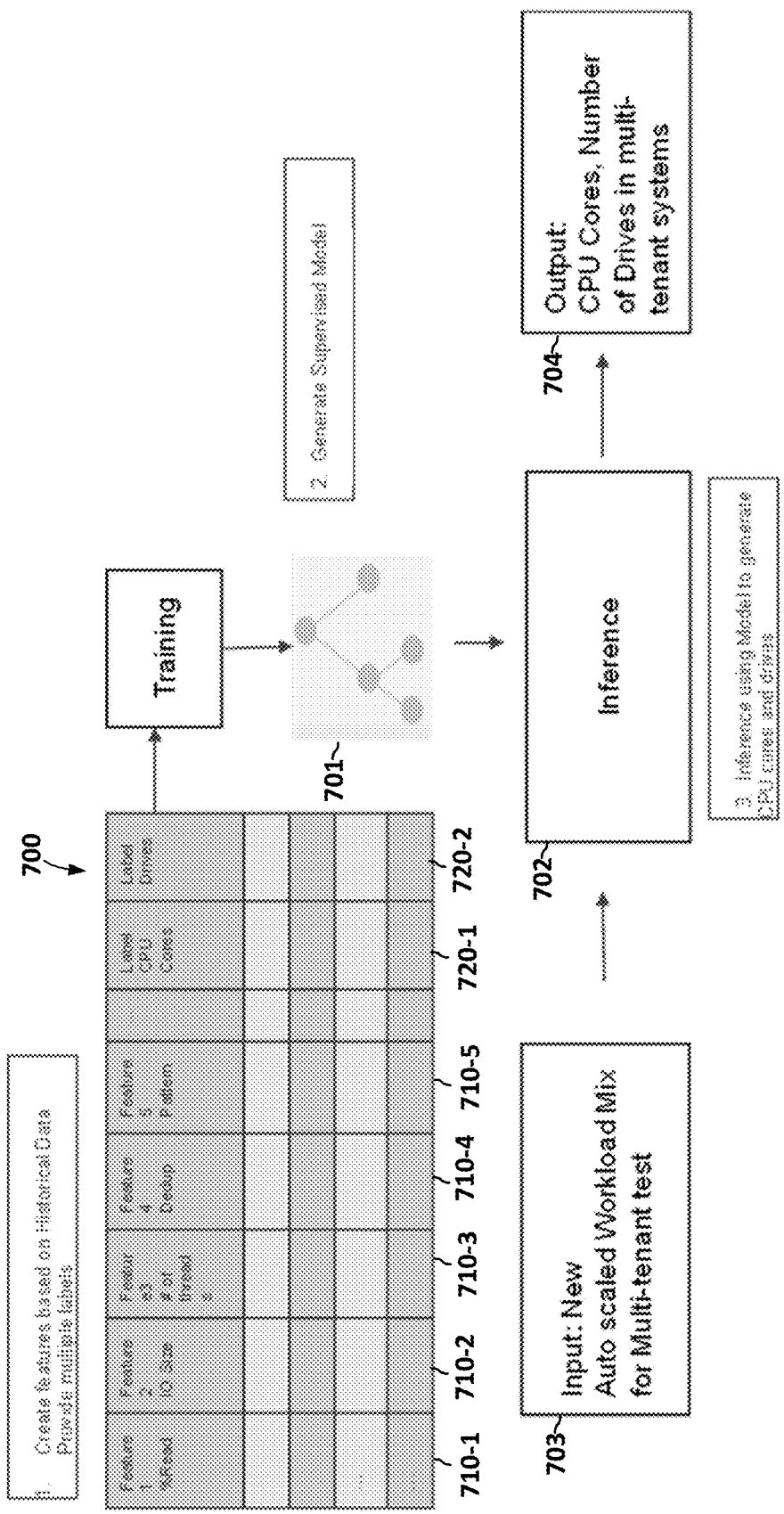
FIG. 7 illustrates the use of supervised learning to identify attributes of a suitable multi-tenant storage array.

FIG. 7 illustrates the use of the ML model 701, adequately trained as described above in FIG. 5, as an inference engine 702 configured to receive data 703 corresponding to a new workload mix to produce predictive output 704 indicating one or more attributes of a multi-tenant storage array suitable for housing the new workload. As depicted in FIG. 7, the model 701 has been trained in accordance with a table 700 indicating at set of features 710 and a set of labels 720. The exemplary set of features 710 illustrated in FIG. 7 include a % read parameter 720-1, an I/O size parameter 720-2, a # threads parameter 720-3, deduplication parameter 720-4, and access parameter 720-5. Other embodiments may however, use more, fewer, and/or a different set of features. The exemplary set of labels 720 illustrated in FIG. 7 include a CPU cores parameter 720-1 and a storage drives parameter 720-2. This exemplary set of labels is intentionally limited to just two parameters for the sake of clarity and brevity, but it will be readily appreciated that other implementations may incorporate any number of additional labels.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for homing a source workload within a multitenant storage environment, the method comprising:
    identifying workload parameters, including a first workload parameter and a second workload parameter, associated with an application workload;
    defining a plurality of value ranges for each of the workload parameters including a first plurality of values ranges for the first workload parameter and a second plurality of ranges for the second workload parameter;
    defining a plurality of bins wherein each bin is associated with a distinct tuple of the value ranges, wherein each of the plurality of bins includes a first tuple component indicative of one of the first plurality of value ranges and a second tuple component indicative of one of the second plurality of value ranges;
    determining a bin mix of the workload, wherein the bin mix indicates which of the plurality of bins correspond to workload activity exceeding a specific threshold;
    specifying inputs and labels for a supervised learning model of a process for homing the application workload in a multi-tenant storage array, wherein the inputs include inputs associated with the bin mix and the labels correspond to attributes of the multi-tenant storage array;
    training the model based at least in part on at least one of: historical data and one or more test cases;
    invoking the model to predict attributes of the multi-tenant array for a new workload mix; and
    identifying a suitable multi-tenant array based on the attributes.

2. The method of claim 1, further comprising: migrating the workload application to the suitable multi-tenant array.

3. The method of claim 1, wherein the workload parameters include at least one parameter selected from a percent read parameter and an I/O size parameter.

4. The method of claim 3, wherein the workload parameters include a percent read parameter and an I/O size parameter and wherein the plurality of bins include a bin corresponding to each combination of percent read value range and I/O size value range.

5. The method of claim 1, further comprising associating the application workload with a scaling factor, wherein identifying a suitable multi-tenant array includes identifying a suitable multi-tenant array based on the scaling factor.

6. The method of claim 1, wherein the features for the supervised learning model include, in addition to the bin mix features, one or more features corresponding to a storage resource attribute associated with the workload application.

7. The method of claim 6, wherein the workload application is associated with block storage and wherein the features for the supervised learning model include a block storage attribute.

8. The method of claim 6, wherein the workload application is associated with file storage and wherein the features for the supervised learning model include a file storage attribute.

9. The method of claim 1, wherein training the model includes generating one or more test cases with a long short term memory (LSTM) generator and discriminating between the one or more test cases and real data.

10. The method of claim 9, wherein the inputs include at least one numerical input and at least one categorical input and wherein generating the test cases includes employing a tanh activation function for the numerical inputs and a softmax function for the categorical inputs.

11. An information handling system, comprising: a central processor unit; and non-transitory computer readable storage, accessible to the processor, including processor executable instructions that, when executed by the processor, result in operations comprising:
    identifying workload parameters, including a first workload parameter and a second workload parameter, associated with an application workload;
    defining a plurality of value ranges for each of the workload parameters including a first plurality of values ranges for the first workload parameter and a second plurality of ranges for the second workload parameter;
    defining a plurality of bins wherein each bin is associated with a distinct tuple of the value ranges, wherein each of the plurality of bins includes a first tuple component indicative of one of the first plurality of value ranges and a second tuple component indicative of one of the second plurality of value ranges;
    determining a bin mix of the workload, wherein the bin mix indicates which of the plurality of bins correspond to workload activity exceeding a specific threshold;
    specifying inputs and labels for a supervised learning model of a process for homing the application workload in a multi-tenant storage array, wherein the inputs include inputs associated with the bin mix and the labels correspond to attributes of the multi-tenant storage array;
    training the model based at least in part on at least one of: historical data and one or more test cases;
    invoking the model to predict attributes of the multi-tenant array for a new workload mix; and
    identifying a suitable multi-tenant array based on the attributes.

12. The information handling system of claim 11, further comprising: migrating the workload application to the suitable multi-tenant array.

13. The information handling system of claim 11, wherein the workload parameters include at least one parameter selected from a percent read parameter and an I/O size parameter.

14. The information handling system of claim 13, wherein the workload parameters include a percent read parameter and an I/O size parameter and wherein the plurality of bins include a bin corresponding to each combination of percent read value range and I/O size value range.

15. The information handling system of claim 11, further comprising associating the application workload with a scaling factor, wherein identifying a suitable multi-tenant array includes identifying a suitable multi-tenant array based on the scaling factor.

16. The information handling system of claim 11, wherein the features for the supervised learning model include, in addition to the bin mix features, one or more features corresponding to a storage resource attribute associated with the workload application.

17. The information handling system of claim 16, wherein the workload application is associated with block storage and wherein the features for the supervised learning model include a block storage attribute.

18. The information handling system of claim 16, wherein the workload application is associated with file storage and wherein the features for the supervised learning model include a file storage attribute.

19. The information handling system of claim 11, wherein training the model includes generating one or more test cases with a long short term memory (LSTM) generator and discriminating between the one or more test cases and real data.

20. The information handling system of claim 19, wherein the inputs include at least one numerical input and at least one categorical input and wherein generating the test cases includes employing a tanh activation function for the numerical inputs and a softmax function for the categorical inputs.

* * * * *